US011417239B1

(12) United States Patent
Carter et al.

(10) Patent No.: US 11,417,239 B1
(45) Date of Patent: Aug. 16, 2022

(54) ELECTRICAL CIRCUIT TRAINING DEVICE AND METHOD

(71) Applicant: Airstreams Renewables, Inc., Tehachapi, CA (US)

(72) Inventors: Kim Carter, Tehachapi, CA (US); Kevin L. Cousineau, Lake Havasu, AZ (US)

(73) Assignee: Airstreams Renewables, Inc., Tehachapi, CA (US)

( * ) Notice: Subject to any disclaimer, the term of this patent is extended or adjusted under 35 U.S.C. 154(b) by 0 days.

(21) Appl. No.: 17/568,469

(22) Filed: Jan. 4, 2022

(51) Int. Cl.
G09B 23/18 (2006.01)
(52) U.S. Cl.
CPC ................... *G09B 23/183* (2013.01)
(58) Field of Classification Search
CPC ..................................................... G09B 23/183
USPC .......................................................... 434/379
See application file for complete search history.

(56) References Cited

U.S. PATENT DOCUMENTS

| 5,222,893 | A | 6/1993 | Hardesty |
| 5,590,057 | A | 12/1996 | Fletcher et al. |
| 10,733,901 | B2 | 8/2020 | Fairchild et al. |
| 2011/0097697 | A1 | 4/2011 | Tharanathan |

OTHER PUBLICATIONS

Lab-Volt Facet Computer-Based Learning for Electronics Training—Product Catalog TA94004-00 Rev. G.
Festo Electronics and Electrical Engineering—Learning Solutions for Basic and Advanced Training.
TTA Technical Training Aids.

*Primary Examiner* — Kesha Frisby
(74) *Attorney, Agent, or Firm* — James M. Duncan; Scanlon Ducan LLP

(57) ABSTRACT

An electrical training simulator allows students to assemble electrical circuits, including motor control circuits, utilizing a variety of lab schematics. The electrical training simulator allows an instructor to induce faults into the student-assembled circuit, thereby requiring the student to apply troubleshooting skills utilizing the lab schematic and digital multimeter to analyze and locate the introduced fault in the circuit. Electrical components are fixedly attached to a component mounting plate. In one embodiment of the invention, the instructor introduces the faults through a fault control panel attached to the electrical training simulator, where the fault control panel is not within view of the student. In another embodiment, the faults may be introduced wirelessly through a remote controller.

20 Claims, 16 Drawing Sheets

| Switch #'s | 1 | 2 | 3 | 4 | Binary ADR | Decimal ADR |
|---|---|---|---|---|---|---|
| | Closed | Closed | Closed | Closed | 0000 | 0 |
| | Open | Closed | Closed | Closed | 1000 | 1 |
| | Closed | Open | Closed | Closed | 0100 | 2 |
| | Open | Open | Closed | Closed | 1100 | 3 |
| | Closed | Closed | Open | Closed | 0010 | 4 |
| | Open | Closed | Open | Closed | 0110 | 5 |
| | Closed | Open | Open | Closed | 1110 | 6 |
| | Open | Open | Open | Closed | 0111 | 7 |
| | Closed | Closed | Closed | Open | 1001 | 8 |
| | Open | Closed | Closed | Open | 0101 | 9 |
| | Closed | Open | Closed | Open | 1101 | 10 |
| | Open | Open | Closed | Open | 0011 | 11 |
| | Closed | Closed | Open | Open | 0011 | 12 |
| | Open | Closed | Open | Open | 1011 | 13 |
| | Closed | Open | Open | Open | 0111 | 14 |
| | Open | Open | Open | Open | 1111 | 15 |

FIG. 11

ELECTRICAL CIRCUIT TRAINING DEVICE AND METHOD

BACKGROUND OF THE INVENTION

The present invention generally relates to training simulators for electrical circuits and more particularly to a training simulator and method of training which allows students to configure electrical circuits, such as those commonly found in industrial applications, according to specified laboratory schematics. The training simulator further allows the student to test the functioning of the circuits. The training simulator further allows an instructor to introduce faults into the circuits configured by the student, thereby requiring the student to troubleshoot the circuit using various testing protocols including using metering devices, while employing safety protocols required for working with electrical circuits.

Training simulators can provide a novice in a particular field with hands-on practical training for situations which may be encountered in the real-world environment of that field. Such devices are particularly helpful in vocational training in technical fields. The use of a simulator allows the student to be introduced to concepts and problem solving which might, if encountered in the real world, present risk of physical harm and/or property damage. The field of electrical technology, which involves, among other things, electrical circuits, reading of electrical schematics, PLC and motor controls, and OSHA standards, is a field in which training is greatly enhanced by using training simulators, thereby avoiding the risks associated with live switchgear. As a result, several different electrical training simulators have been developed and are known.

Electrical training simulators typically present a front panel with AC and DC power sources, resistors, capacitors, transformers, relays, and related devices and components encountered in the real-world environment. These trainers are generally designed to introduce students to the basic principles of electrical circuits, in both direct current and alternating current environments, industrial controls, 3-phase power supplies along with 3-phase resistive loads, capacitive loads and inductive loads, motor starters, motors, programmable logic controllers, and related concepts. The electrical training simulators may also a lock-out/tag-out switch which provides critical training for safe operations when working with electrical circuits.

The simulators will allow a student, utilizing a wiring diagram, to build an electrical circuit by connecting a power supply and various components with connecting leads, such as banana connectors. Once the circuit has been assembled, these simulators typically allow the student to test the circuit and to troubleshoot any problems in the circuit with various diagnostic tools, such as digital multimeters, amp clamps, megohmmeters, phase rotation meters and other diagnostic devices, to isolate and identify the problem. Some simulators provide means for an instructor to induce a fault in the student-assembled circuit, thereby providing the student the opportunity to troubleshoot the circuit to determine the fault. Such exercises are very valuable in teaching the student the appropriate process for troubleshooting problem in electrical circuits and the safety precautions to be taken in the process.

Vocational training for certain fields, such as power generation, power distribution, telecommunications, etc., should be particularly rigorous because of the inherent complexity of the equipment utilized in those fields, and because of the potential magnitude of loss of life and/or property presented by failures in those fields. Thus, it is desirable that an electrical training simulator provide a substantial number of options to an instructor to induce faults in each student-assembled circuit. It is also desirable that the faults be induced in such a manner that the student is not able to short-cut the troubleshooting exercise by visually inspecting components of the simulator to determine the nature of the fault. For example, some prior art simulators utilize switches on the bottom or backside of a component to induce the fault, thereby allowing a student to look underneath the component or at the backside of the simulator panel to identify the fault. It is desirable that an electrical training simulator be configured such that is does not provide any visual indication of the induced fault. It would also be desirable that an instructor is capable of inducing the faults remotely from the electrical training simulator.

It is also desirable to have an electrical training simulator configured to have multiple panels so that more than one student may be trained on a single simulator at the same time but reducing the expense of the simulator by allowing some shared components.

SUMMARY OF THE INVENTION

Embodiments of the present invention address the above-described desired features of an electrical training simulator. The electrical training simulator may be utilized to train and educate persons in the operation, maintenance and troubleshooting of electrical control systems utilized in a variety of industrial and municipal applications, including power generation, telecommunications, manufacturing, the like. Embodiments of the present invention allow students to apply what they have learned in the classroom through the trainer to identify, build/wire and troubleshoot a variety of electrical circuits, including motor control circuits utilizing a variety of lab schematics provided by the training personnel. Each lab starts with basic circuits using transformers/power supplies, indicating lights, various types of switches. Building upon the basic circuits the students assemble more complex circuits, including motor control circuits using contactors, control relays, timing relays and a 3-phase brake motor.

The electrical training simulator is configured to allow instructors to generate faults or alarms within the student-assembled circuits to train student technicians in proper troubleshooting techniques. The introduced faults can simulate a number of different circuit malfunctions, including a failed source or supply, bad indicating light, failed contractor switch or coil, or bad momentary switch. The student learns basic troubleshooting skills using the lab schematic and digital multimeter to analyze and locate the introduced fault in the circuit. The invention further provides training for students to follow the procedures required to establish an electrically safe work condition (ESWC), including safe execution of lockout and tagout (LOTO) procedures and hot-cold-hot procedures.

Existing trainers typically utilize removable modular components having accessible fault switches which the instructor may set as desired to induce faults in the circuit. Because the components of existing trainers are removable, students can gain physical access to visually ascertain which components have triggered fault switches. However, all components of the embodiments of the presently disclosed electrical training simulator are fixedly attached into the device, preventing any visual assessment of the components. Embodiments of the present electrical training simulator thus prevent students from gaining any advantage which otherwise might be gained from visually inspecting the sides and back of the components. This feature enables the instructional staff to consistently measure student performance based upon the diagnostic techniques they will be required to utilize in real world applications without any advantage gained from visual inspection of switch position. All electrical components may be pre-mounted to each side of embodiments of the present invention, eliminating the need for students to share modules, select specific modules from inventory, and install the modules prior to the start of an exercise. This feature saves time, allowing the student to spend more time working on the actual exercise. In addition, with prior art module-type trainers, there may be a limited number of modules, thereby limiting the number of like labs which can be performed at one time.

Embodiments of the presently disclosed electrical training simulator do not utilize modular components, but rather utilize built-in components which are not accessible or removable by students. In addition to the advantages discussed above, this configuration reduces the possibility of handling damage to the components which can occur with prior art systems which utilize modular components which are removable from the training simulator.

Embodiments of the presently disclosed training simulator may have four sides comprising two opposite-facing work panels connected at each end with a side plate thereby forming an enclosure having an interior. The work panels each provide exterior access to power supplies, lock-out/tag-out switching, transformers, relays, processor controls, switches, indicator lights, and terminal blocks for a single student, using connecting leads, to assemble, test, and trouble-shoot electrical circuits. The interior contains components and connecting boards and wiring required for the operation of the training simulator. The interior is accessible through one or both side plates, which may be pivotally attached to one of the work panels with hinges or other connecting hardware to allow the side plates to be pivoted open, for human entry into the interior. This configuration allows easy access to the interior by authorized personnel for configuration and maintenance of the various components of the simulator. However, it is to be appreciated that, given the size of the side panels, opening a side panel to access the interior of the simulator may be limited to authorized personnel by locks or like security devices. This feature of the simulator prevents unauthorized access during any supervised activities or simulation exercises. The two-panel configuration allows a single training simulator to be simultaneously utilized by two different students, each working on opposite sides of the simulator.

Embodiments of the present electrical training simulator allow an instructor to induce faults in student circuits either remotely or from a panel hidden from the view of the student. For example, the fault panels may be located the side plates. With this configuration, there will typically be a separate fault panel dedicated to each work panel, with fault panel set within an box mounted on each of the side plates Alternatively, the faults may be induced through a microprocessor-based control system employing a plurality of available communications systems including standard WiFi, private Wifi or direct hard wire serial links. These, combined with a PC based application program, allow the operator to induce faults may include issues such as a failed source or supply, bad indicating light, failed contactor switch or coil, and/or a bad momentary switch.

BRIEF DESCRIPTION OF THE DRAWINGS

FIG. 11 provides a table showing how each of the fault inducing Relay Output (RYO) Boards can be provided a unique address in both binary and decimal format by multi-position dip switches.

DETAILED DESCRIPTION OF THE INVENTION

Figure 1:
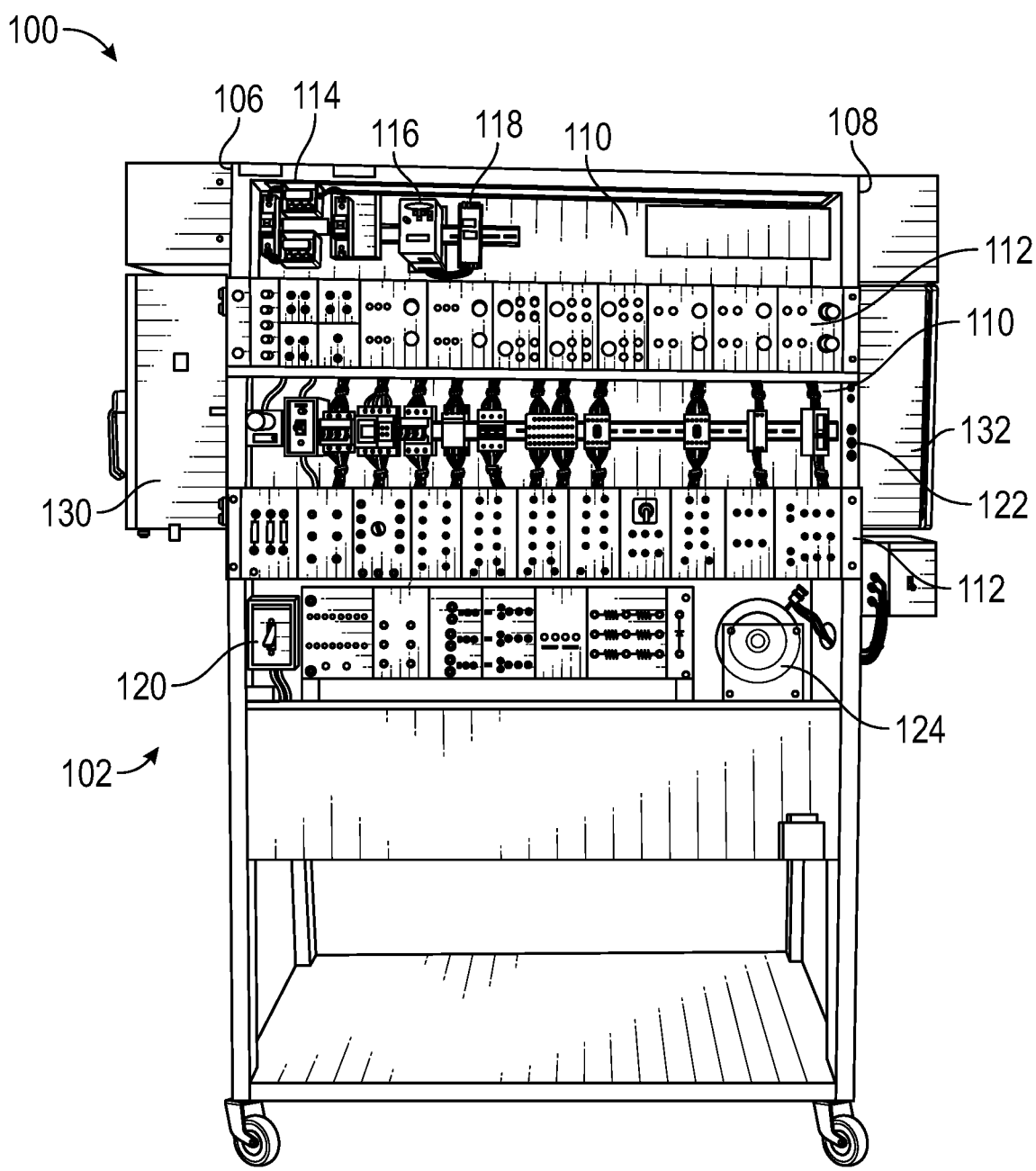
FIG. 1 shows a front panel of an embodiment of the disclosed electrical training simulator which utilizes a localized fault control panel for each of the panels of the simulator.
Figure 2:
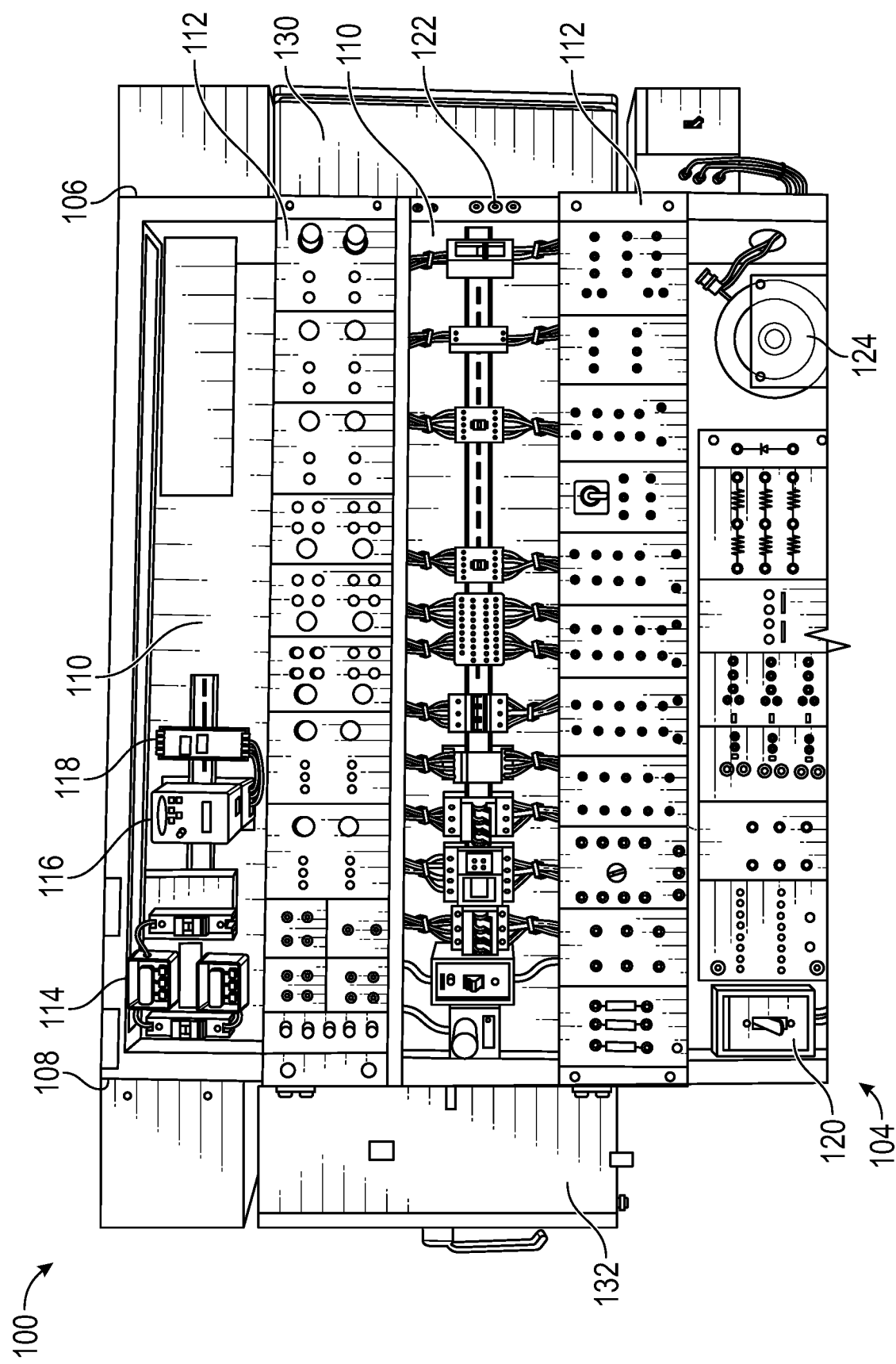
FIG. 2 shows a rear panel of an embodiment of the disclosed electrical training simulator, the rear panel being a mirror image of the front panel.

Referring now to the Figures, FIGS. 1-4 show an embodiment of the electrical training simulator 100. FIG. 1 shows a first work panel 102 of the simulator 100 and FIG. 2 shows a second work panel 104 of the simulator 100, where first work panel 102 and second work panel 104 may be disposed back-to-back and conjoined by side 106 and side 108 and may be configured into a four-sided unit having an accessible interior. Alternatively, an embodiment of the electrical simulator may comprise a single work panel and a non-functioning panel in back-to-back relation and conjoined by sides and configured into a four-side unit having an accessible interior. Embodiments of the simulator 100 may also be configured as transportable units having wheels or rollers. Alternatively, an embodiment of the electrical simulator may comprise a single work panel and a non-functioning panel in back-to-back configuration. All embodiments of the four-sided unit have an interior portion which allows access to the backsides of first work panel 102 and second work panel 104. One or both of side 106 and side 108 may be pivotally attached to first work panel 102 or second work panel 104 by hinges or the like, allowing first work panel 102 or second work panel 104 to be pivoted open to allow human access as required for gaining access to the backsides of work panels 102, 104 and other components located inside the electrical training simulator 100 for setting up or maintaining the simulator. Alternatively, sides 106, 108 may be fastened to first work panel 102 and second work panel 104 with fasteners or like means.

In one embodiment of the invention, first work panel 102 and second work panel 104 may be simultaneously utilized by two different students to assemble different circuits as per schematics provided by training staff. Both first work panel 102 and second work panel 104 may have a single power switch.

First work panel 102 and second work panel 104 each comprise component mounting plates 110 and terminal plates 112. The electrical components of first work panel 102 and second work panel 104 may be identical and for purposes of this disclosure, the components disposed within component mounting plates 110 of first work panel 102 and the components disposed within component mounting plates 110 of second work panel 104 are identical. The components are fixedly attached to the component mounting plates 110, 112. For purposes of this disclosure, the term "fixedly attached" is defined to mean that removal of the components from the component mounting plates 110, 112, requires the use of a tool. This feature of the invention prevents a student from gaining any visual advantage by manual removal of the components from the component mounting plates 110, 112.

Among the components fixedly attached to the component mounting plates are a fused 208 VAC/120 VAC transformer 114, AC drive 116, and a 24 VDC power supply 118. Terminal plates 112 comprise a plurality of terminals for power supplies, switches, lights, overload relays, control relays, timing relays, interposing relays, resistors, diodes, motor connections, overload protection and connectors for a lock-out/tag-out switch. First work panel 102 and second work panel 104 also comprise lock-out/tag-out switch 120 and hot-cold-hot measuring terminals 122. First work panel 102 and second work panel 104 further comprise squirrel cage motor 124.

Figure 3:
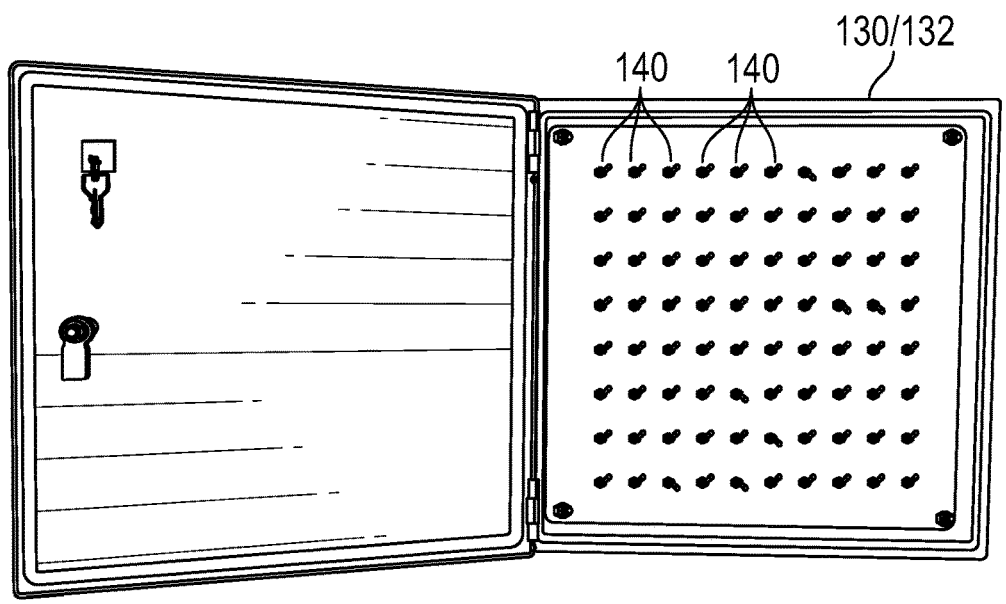
FIG. 3 shows a fault control panel utilized for imposing faults on one of the panels shown in either FIG. 1 or FIG. 2.
Figure 4:
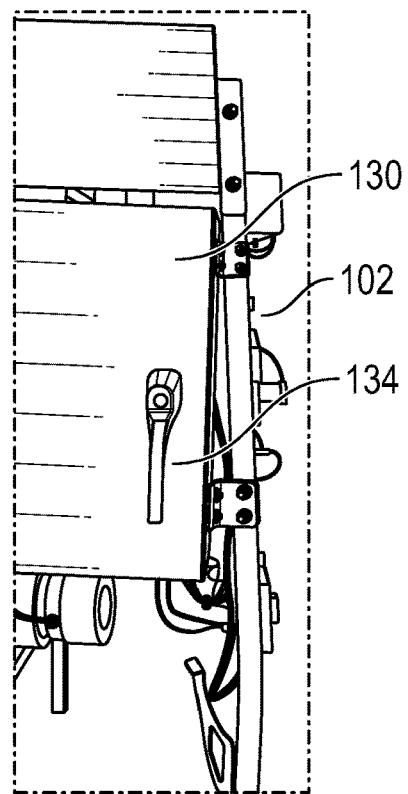
FIG. 4 shows an enclosure utilized to enclose the fault control panel of FIG. 3.

The embodiment of electrical training simulator 100 shown in FIGS. 1-4 also have a first fault box enclosure 130 for first work panel 102 and a second fault box enclosure 132 for second work panel 104. First fault box enclosure 130 and second fault box enclosure 132 are identical on the inside, each containing a plurality of fault switches 140 as shown in FIG. 3 (for clarity, lead lines are only shown for a few of the eighty switches shown in FIG. 3). FIG. 4 shows that handle 134 faces toward the first work panel 102, providing a visual indicator of the work panel associated with the fault switches contained within the first fault box enclosure 130. Similarly, the second fault box enclosure 132 has a similar handle which faces toward the second work panel 104. The faults introduced by switches 140 can simulate a number of different circuit malfunctions, including a failed source or supply, bad indicating light, failed contractor switch or coil, or bad momentary switch. The student learns basic troubleshooting skills using the lab schematic and digital multimeter to analyze and locate the introduced fault in the lab schematic. The fault box enclosure 130 and its fault switches 140 are configured such that a student assembling a circuit on either the first work panel 102 or the second work panel 104 are unable to see the position of any of the fault switches, thereby preventing the student from having any visible indication of the fault.

Figure 5:
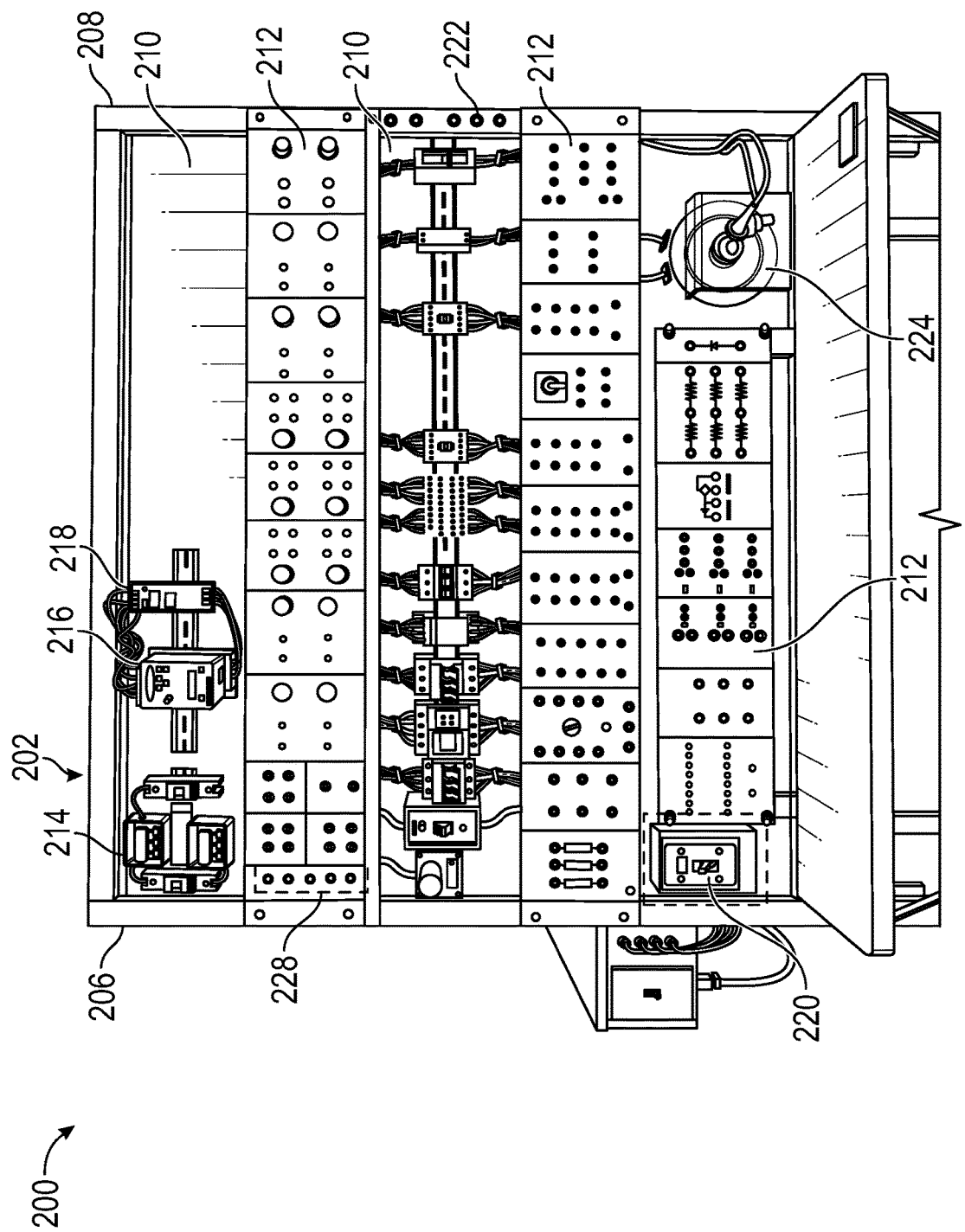
FIG. 5 shows a front panel of a second embodiment of the disclosed electrical training simulator which utilizes a remotely located digitally operated fault control system for each of the panels of the simulator.
Figure 6:
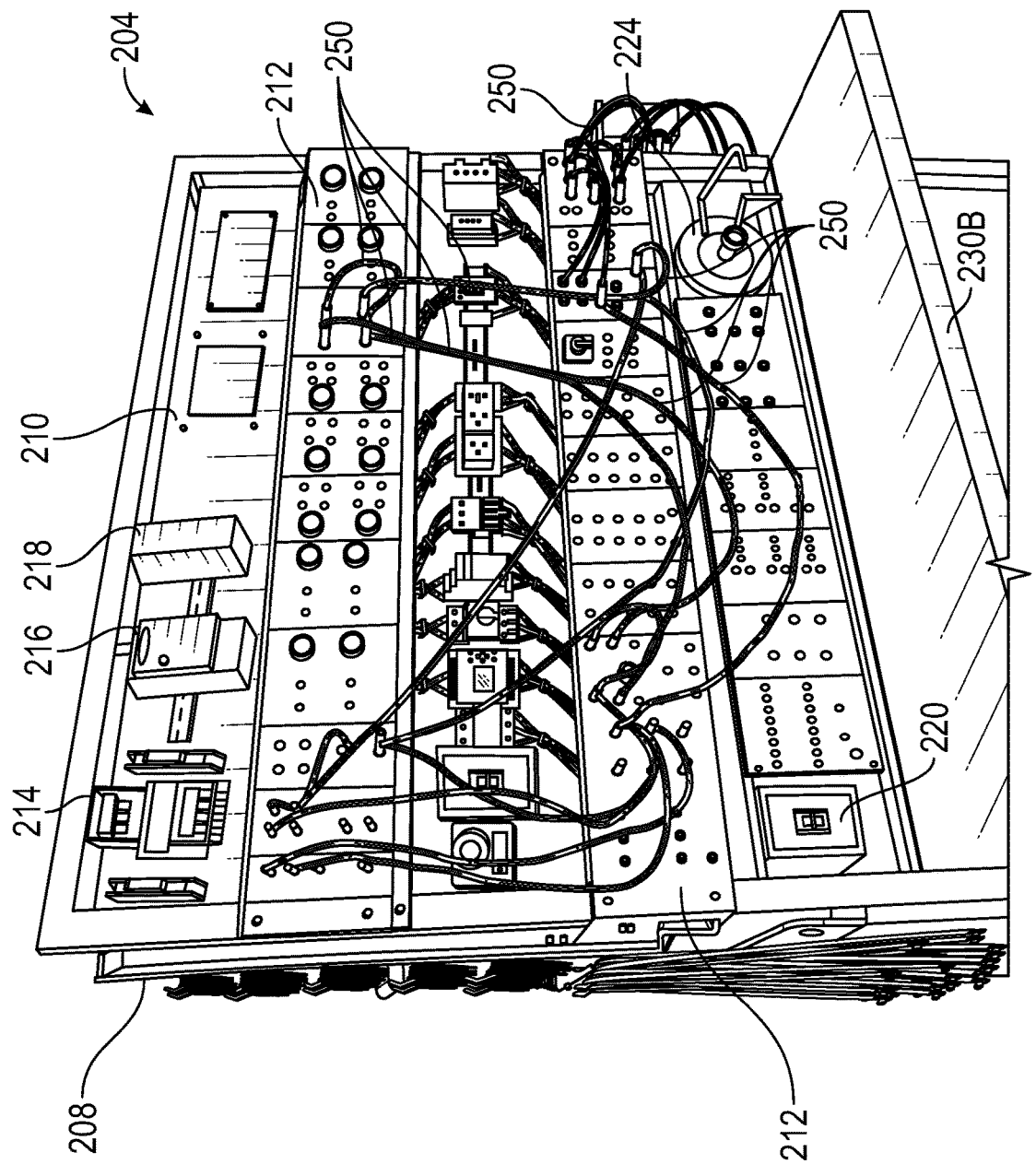
FIG. 6 shows a rear panel of an embodiment of the disclosed electrical training simulator, the rear panel being a mirror image of the front panel.
Figure 7:
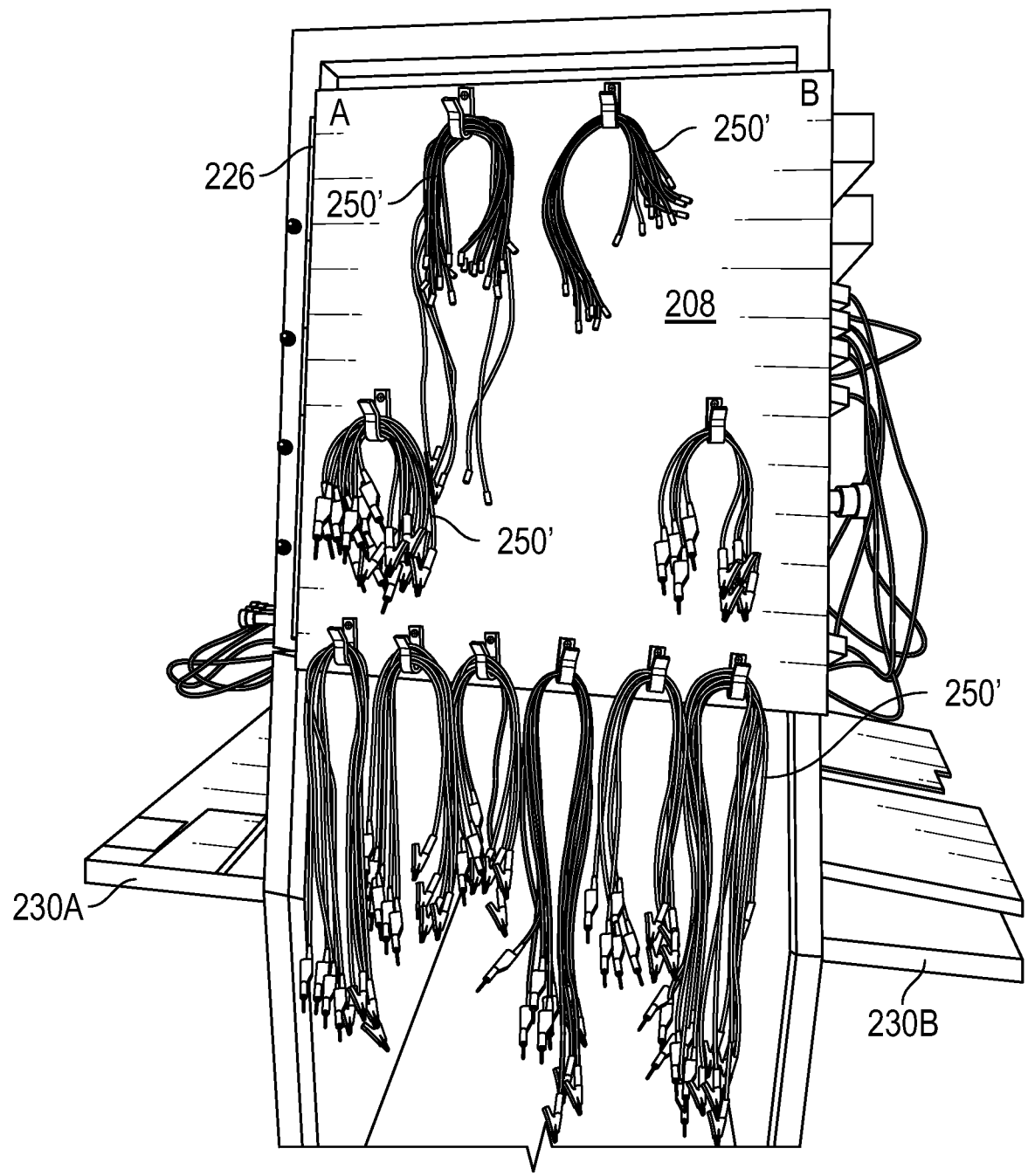
FIG. 7 shows a side panel of the second embodiment of the disclosed electrical training simulator, showing how the side panel may be utilized for storage of wire leads with banana terminal ends.

FIGS. 5-7 depict a second embodiment of the present electrical training simulator 200 which comprises components which enable remote fault introduction. FIG. 5 shows a first work panel 202 of the simulator 200 and FIG. 6 shows a second work panel 204 of the simulator 200. First work panel 202 and second work panel 204 are disposed back-to-back and conjoined by side 206 and side 208 thereby forming an enclosed mobile unit having interior 210 as shown in FIG. 17. One or both of side 206 and side 208 may be pivotally attached to first work panel 202 or second work panel 204 by hinges 226 or the like, allowing first work panel 202 or second work panel 204 to be pivoted open to allow human access as required for setting up or maintaining the electrical training simulator 200. Alternatively, sides 206, 208 may be fastened to first work panel 202 and second work panel 204 with fasteners. First work panel 202 and second work panel 204 may be simultaneously utilized by two different students to assemble different circuits as per schematics provided by training staff.

First work panel 202 and second work panel 204 each comprise component mounting plates 210 and terminal plates 212. The electrical components of first work panel 202 and second work panel 204 may be identical and for purposes of this disclosure, the components disposed within component mounting plates 210 of first work panel 202 and the components disposed within component mounting plates 210 of second work panel 204 are identical. Among those components are a fused 208 VAC/120 VAC transformer 214, AC drive 216, and a 24 VDC power supply 218. Terminal plates 212 comprise a plurality of terminals for power supplies, switches, lights, overload relays, control relays, timing relays, interposing relays, resistors, diodes, motor connections, overload protection and connectors 228 for a lock-out/tag-out switch. First work panel 202 and second work panel 204 also comprise lock-out/tag-out switch 220 and hot-cold-hot measuring terminals 222. First work panel 202 and second work panel 204 further comprise squirrel cage motor 224.

FIG. 6 shows second work panel 204 having a plurality of connecting leads 250 extending between different component terminals, as would be done by a student following a prepared schematic to build a specific circuit as provided in a prepared schematic.

FIG. 7 shows side 206 or 208 of an embodiment of the electrical training simulator 200. FIG. 7 indicates a side "A" which refers to first work panel 202 and a side "B" which refers to second work panel 204. Spare connecting leads 250' may be hung on hooks or the like on either side 206 or 208 as shown in FIG. 7. FIG. 7 also shows cantilevering desktops 230A, 230B.

Figure 8A:
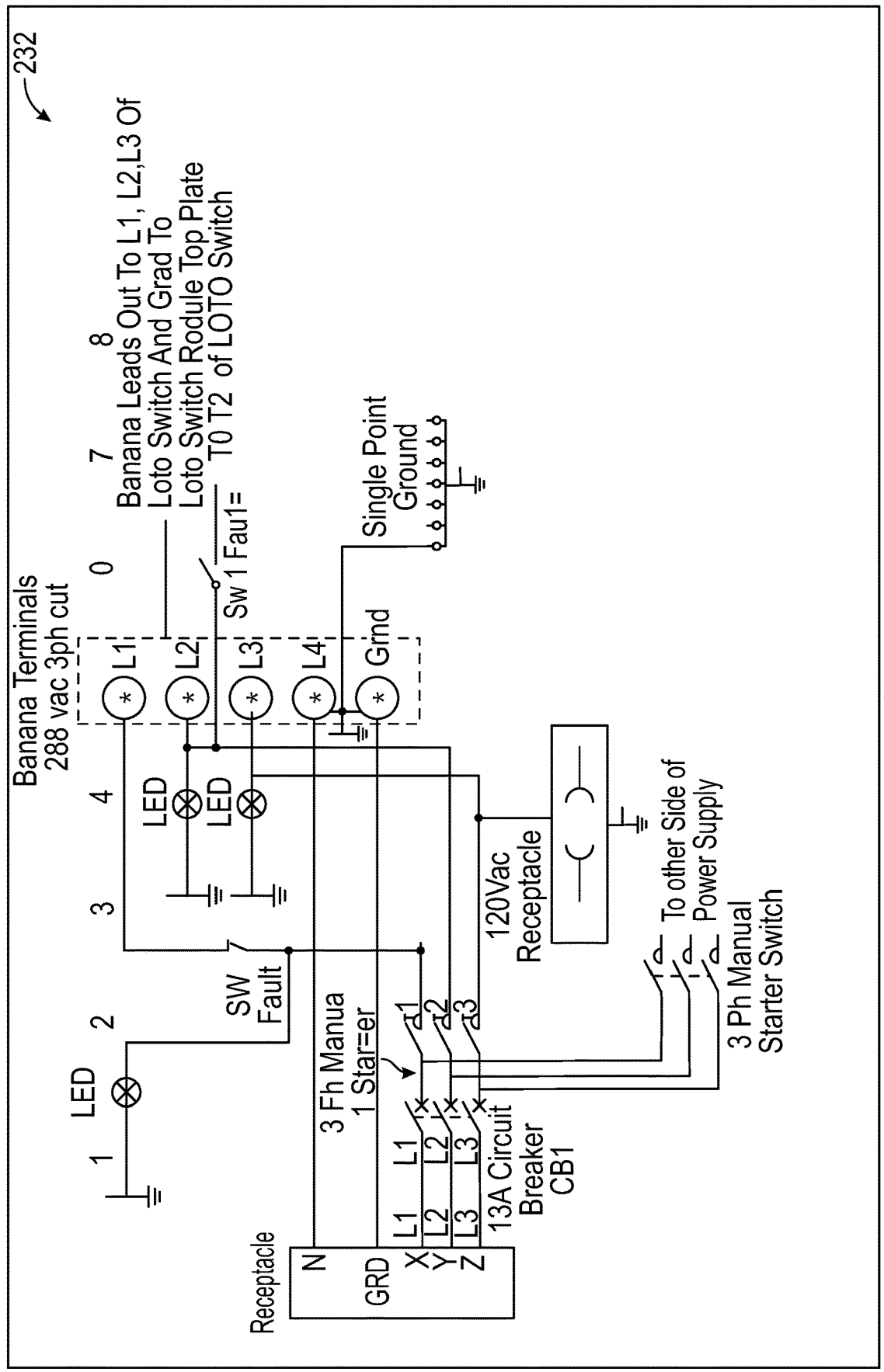
FIG. 8A schematically depicts an embodiment of a power supply for one side of an embodiment of the electrical training simulator which has a local fault induction panel.
Figure 8B:
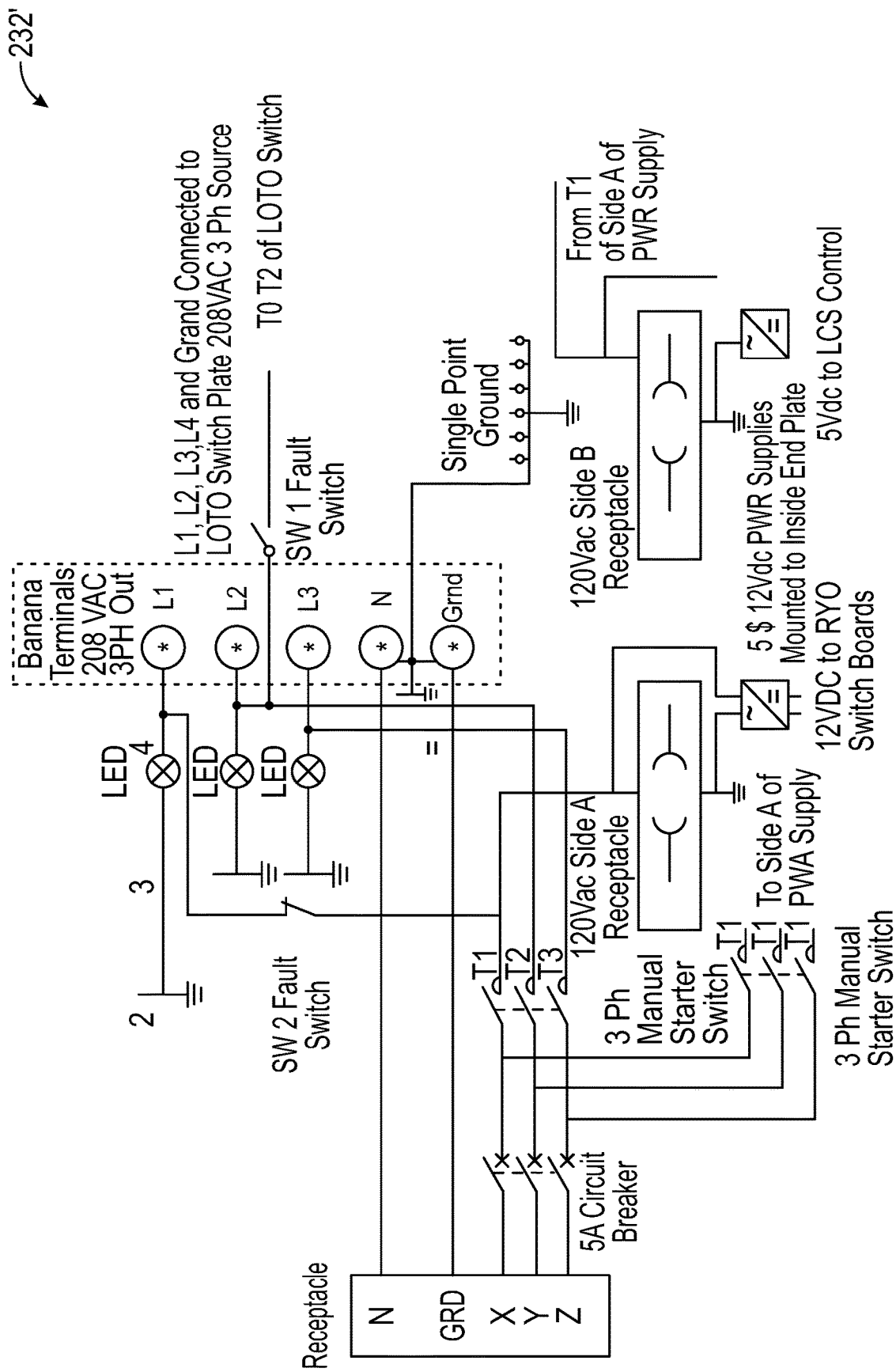
FIG. 8B schematically depicts an embodiment of a power supply for one side of an embodiment of the electrical training simulator which utilizes remotely actuated faults.

FIG. 8A schematically depicts a power supply 232 which may be utilized for providing 208 VAC three phase power to work panels 102, 104 for embodiments of the invention which utilizes a local fault induction. FIG. 8B schematically depicts a power supply 232' which may be utilized for providing 208 VAC three phase power to work panels 202, 204 for embodiments of the invention which utilize a remotely located digitally operated fault control system 240.

Figure 9:
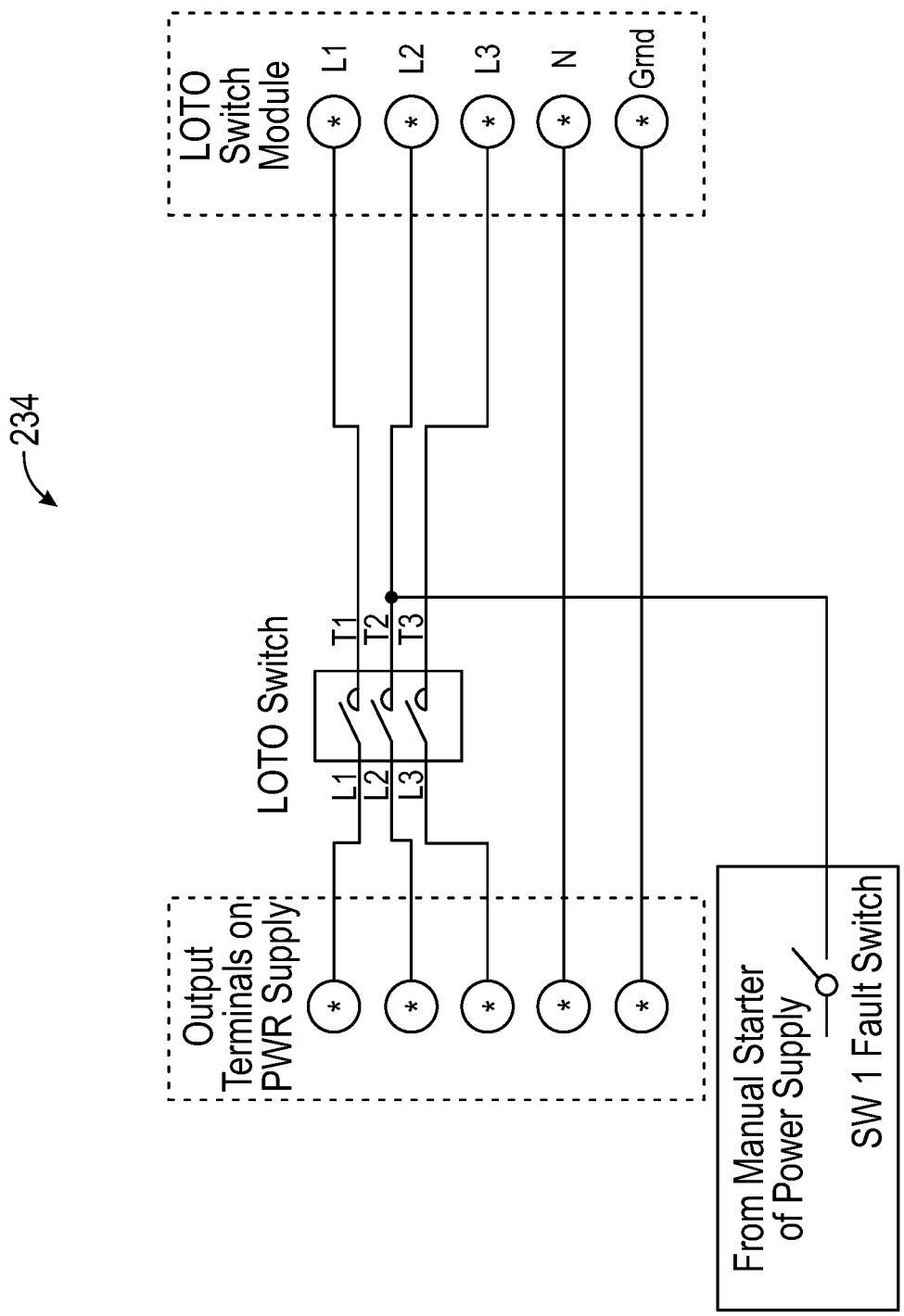
FIG. 9 schematically depicts a power supply output to lock-out/tag-out switches.

FIG. 9 schematically depicts a power supply 234 output to lock-out/tag-out switches on work panels 102, 104, 202, 204.

Figure 10:
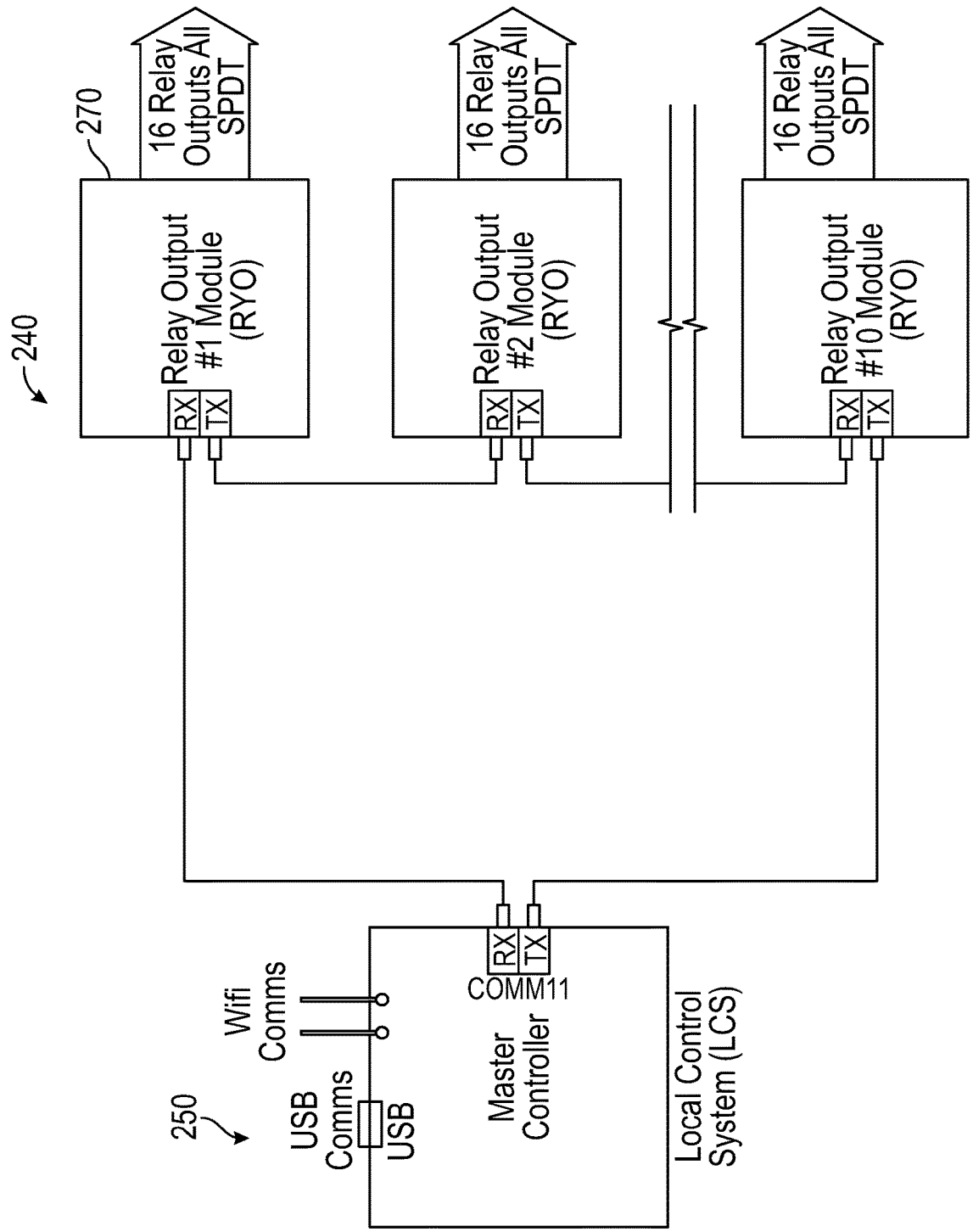
FIG. 10 is a block diagram depicting an overview of the digitally operated fault control system utilized in embodiments of the electrical training simulator, showing a local control system (LCS) controller 250 and its slave controllers 270 showing how, for example, 160 output relays may be controlled by the controller 250 via a local fiber optic serial communication loop. This allows the slave controller Relay Output Boards 270 to be located near their control elements helping to shorting the wiring lengths.

FIG. 10 is a block diagram depicting an embodiment of a remotely located digitally operated fault control system 240 utilized in embodiments of the electrical training simulator 200. An embodiment of fault control system 240 may control up to 256 individual relays that are connected to the electrical training simulator 200 for introducing faults into a student-assembled circuit. Fault control system 240 comprises two sections, being a local control system ("LCS") 250 and a plurality of relay output boards ("RYOs" or "RYO boards") 270, typically ten, but as configured may be as many as 16. As noted previously, the ability of this system to handle up to 256 RYO boards is possible when larger addressing switches are employed. The LCS 250 communicates to each of the RYO boards 270 via a duplex fiber-optic daisy chain system with each of the RYOs having an individual address which may be set up through a 4-bit DIP switch on the RYO board. As previously noted, this DIP switch may be as large as an 8-bit allowing up to 256 RYO boards 270 in this same communication system for a total of 1024 relays. Other configurations would allow even more.

FIG. 11 provides a table showing how each of the RYO boards 270 may be provided a unique address in both binary and decimal format by 4 position dip switches. When the LCS 250 commands an output, it comes with an address, so a specific RYO board 270 turns on or off according to the address. Each command issued from the LCS 250 is passed from RYO 270 to RYO 270 before returning to the LCS 250, but only those RYOs 270 having the same address as the LCS command will respond. While FIG. 11 depicts a four-bit switch, larger switches may be used, such as an 8-bit, which would provide for up to 256 boards on a single communication loop.

Figure 12:
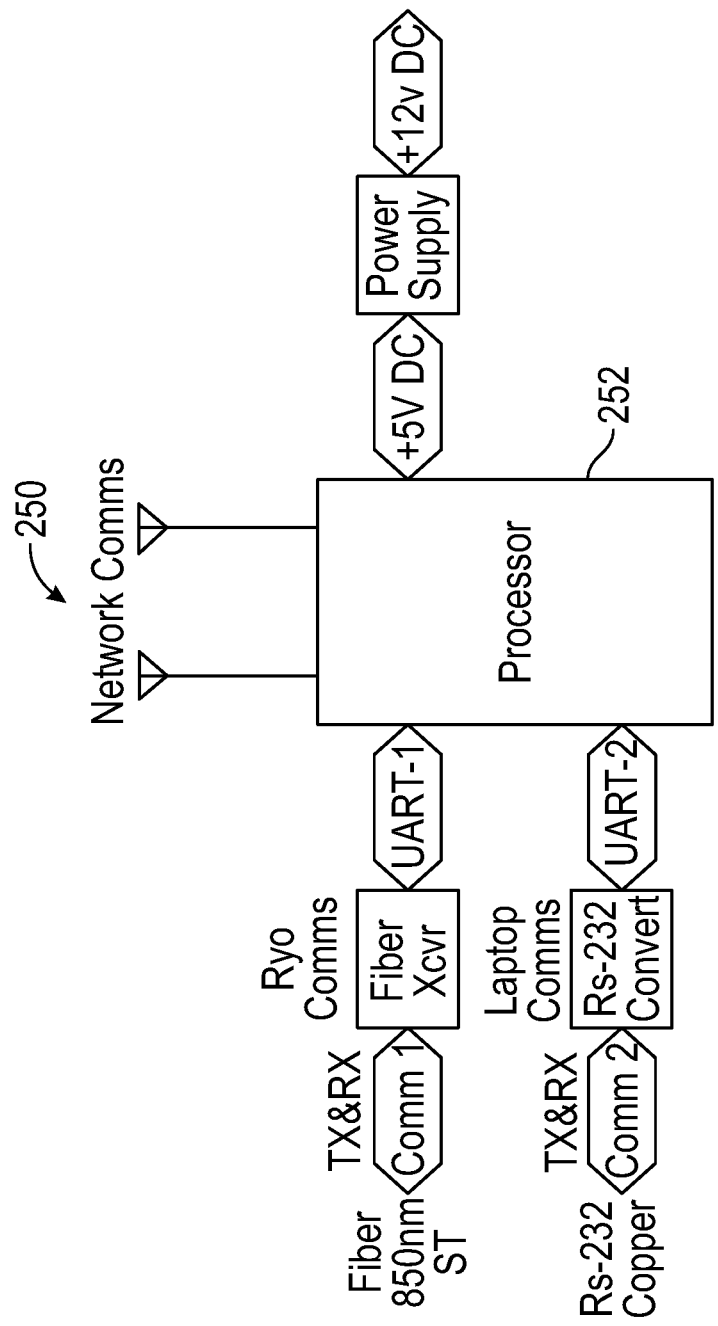
FIG. 12 is a block diagram depicting the design and operation of a local control system utilized in embodiments of the remotely located digitally operated fault control system.

FIG. 12 is a block diagram showing the complete fault control system consisting of a single Local Control System or LCS 250 and remote Relay Output Boards (RYO) for fault control. The LCS 250 consists of a small mother board with mounting headers for installation of a credit-card sized, low-power, 1 GHZ, Linux open hardware ARM processor board 252, such as a BEAGLEBONE Black Wireless available through BEAGLEBOARD.org. This board contains a built-in WiFi communication system including antennas and is powered by the mother board. The ARM processor board 252 is attached to the LCS motherboard via its two 46 pin header strips. The motherboard also contains the fiber-optic transmitter and receiver for communication to the RYOs 270. The motherboard 252 also has a RS-232 port provided via a DB9 connector. The LCS 250 is designed to receive commands from WiFI connected devices, such as laptops, tablets, etc., through a controller application program. In addition, the WiFi used may be a private WiFi system or by employing the RS-232 port this may be a direct connection to any laptop or desktop with the proper LCS application program installed. The LCS 250 thereafter communicates with the applicable RYO boards 270 with the controller application program allowing the operator to run each RYO 270 individually or, if required, in groups. Embodiments of the invention may utilize fiber-optic cables to communicate signals received through the wireless connection to fault relay boards built into the electrical training simulator 200.

The mother board of the LCS 250 is powered from a 12-volt supply provided by the training simulator 200. Connections on the two 46 pin header strips on the mother board provide for a universal asynchronous receiver-transmitter (UART 1) for operation of the fiber optic transmitter and receiver for RYO communication and a second UART (UART 2) that is converted to RS-232 levels for connection to a laptop or other computer if necessary. This connection can also be utilized for system checking of the training simulator itself. Normal connections are through the local or private WiFi network. The LCS mother board has an address DIP switch which allows multiple fault control systems 240 to be controlled from a single laptop or desktop computer through the local WiFi network, thereby allowing fault introduction into multiple electrical training simulators 200 from a single device.

Figure 13:
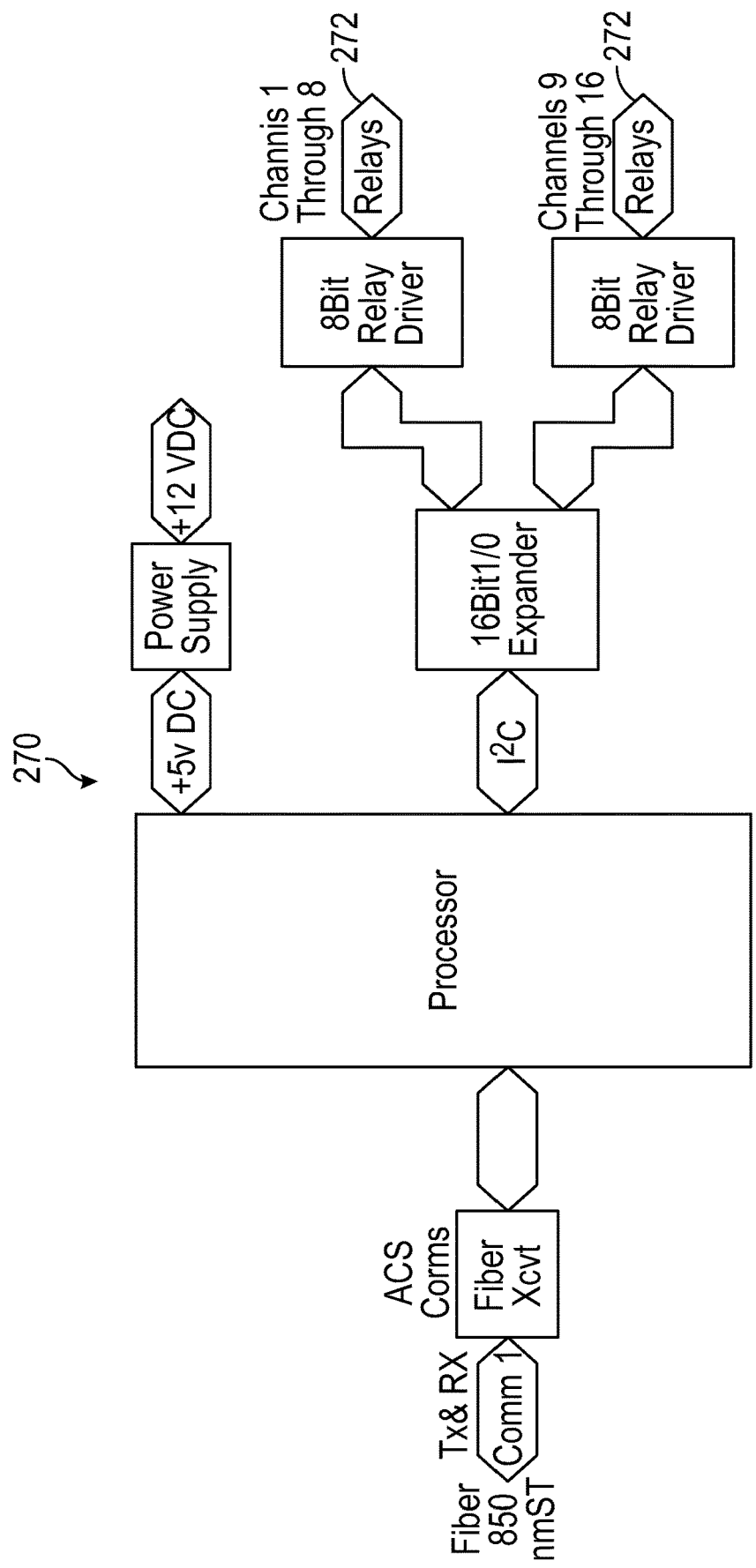
FIG. 13 is a block diagram showing the design and operation of the RYO boards utilized in embodiments of the remotely located digitally operated fault control system.

FIG. 13 is a block diagram showing the design and operation of the RYO board 270. While FIG. 13 shows an embodiment having 16 relay outputs, other quantities may be used as required for other embodiments of the invention. Each of the RYOs utilized in the fault control system 240 may have 16 mechanical relays 272 that can be turned on or off by the operator of a laptop or desktop in communication with the RYO 270 through the LCS 250. The output contacts for each relay 272 are typically rated at 8 amps and rated to switch up 240 VAC. Each relay 272 has one normally open and one normally closed contact with a common armature, allowing the RYO boards 270 to be wired in either configuration as required by the specific load. The RYO boards 270 employ relatively simple but high performance 8-bit processors. The processor communicates via the RYO board's fiber optic devices. The RYO board 270 is programmed to accept all communication from the LCS 250 and respond only to those commands that concur with the RYO board's specific communication address, as discussed above. Each RYO is powered by a remote 10 to 14 VDC (12 volt nominal) power supply at 0.5 amps max.

Each RYO board 270 has 16 outputs available on 16 individual terminal strips labeled TB1 through TB16, typically configured with eight on the left side of the board and eight on the right side of the board. A fiber optic transmitter and receiver will typically be on the lower left-hand side of the RYO 270 while a terminal strip (TB17) is for the volt power supply input. Light emitting diodes ("LEDs") are provided for all 16 relay outputs. A separate LED, located on the lower left-hand side of the board, is provided to indicate that the RYO is transmitting. Two additional LEDs, located on the lower right-hand side of the board. The first, a processor "heart beat" indicator, flashes once per second to indicate that the processor on the RYO board is functioning properly. The second LED on the lower right-hand side of the board is illuminated when 12 volts is applied to TB17.

The LCS 250 and RYOs 270 both use 850 nm wavelength fiber optic technology capable of operating at 1 mega baud to deliver commands to specific relays with no noticeable delay. A UART (RB5 and RB2) is used for fiber optic communication to the LCS 250. A second communication loop I2C is used along with a MICROCHIP I/O expander to drive two 8-bit driver circuits and 8 relays each, for a total of 16 outputs.

Figure 14:
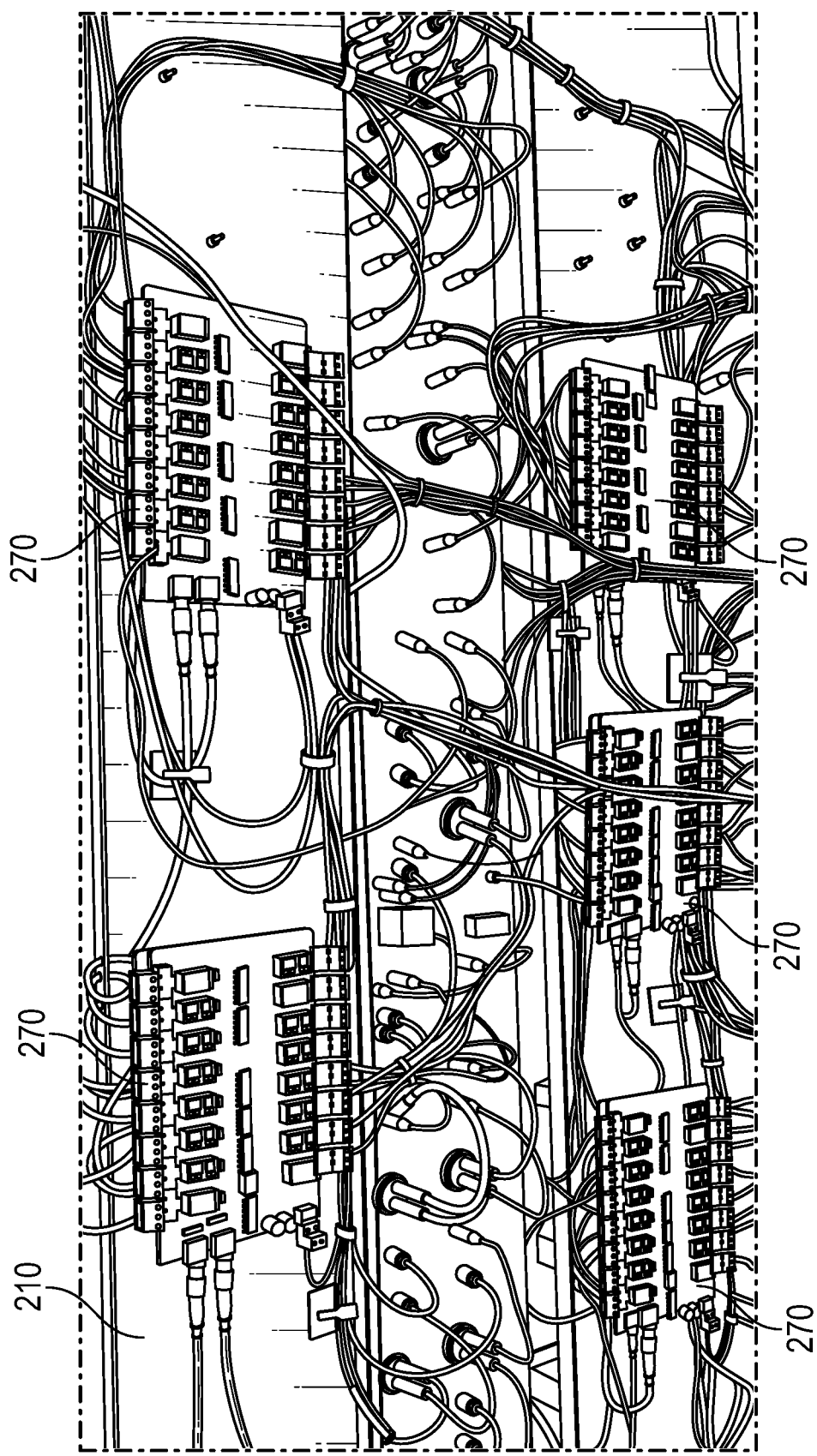
FIG. 14 depicts a plurality of RYO board disposed within the interior of an embodiment of the electrical training simulator which utilizes a remotely located digitally operated control system for each of the panels.
Figure 15:
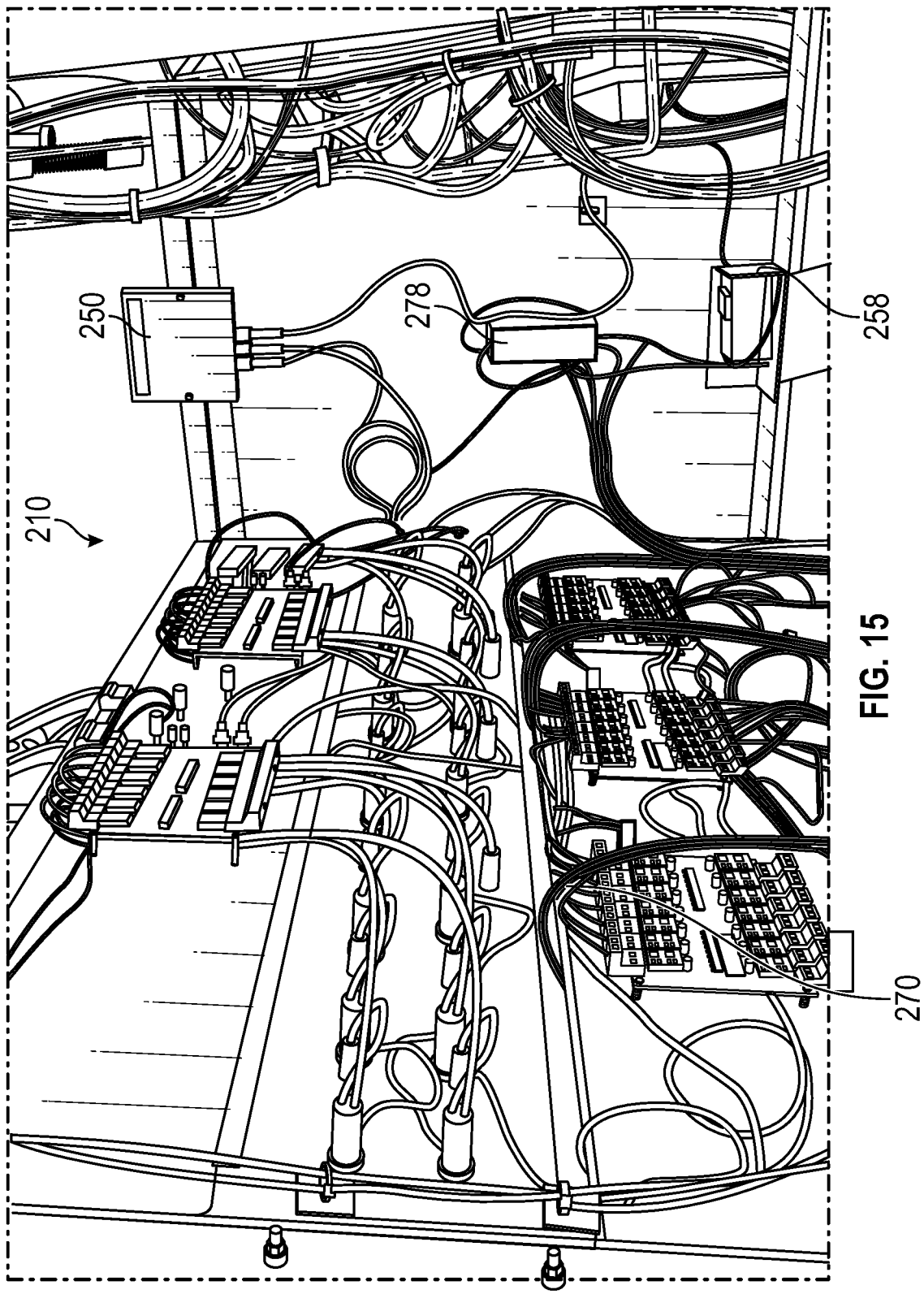
FIG. 15 depicts the interior of an embodiment of the embodiment of the electrical training simulator which utilizes a remotely located digitally operated control system for each of the panels.
Figure 16:
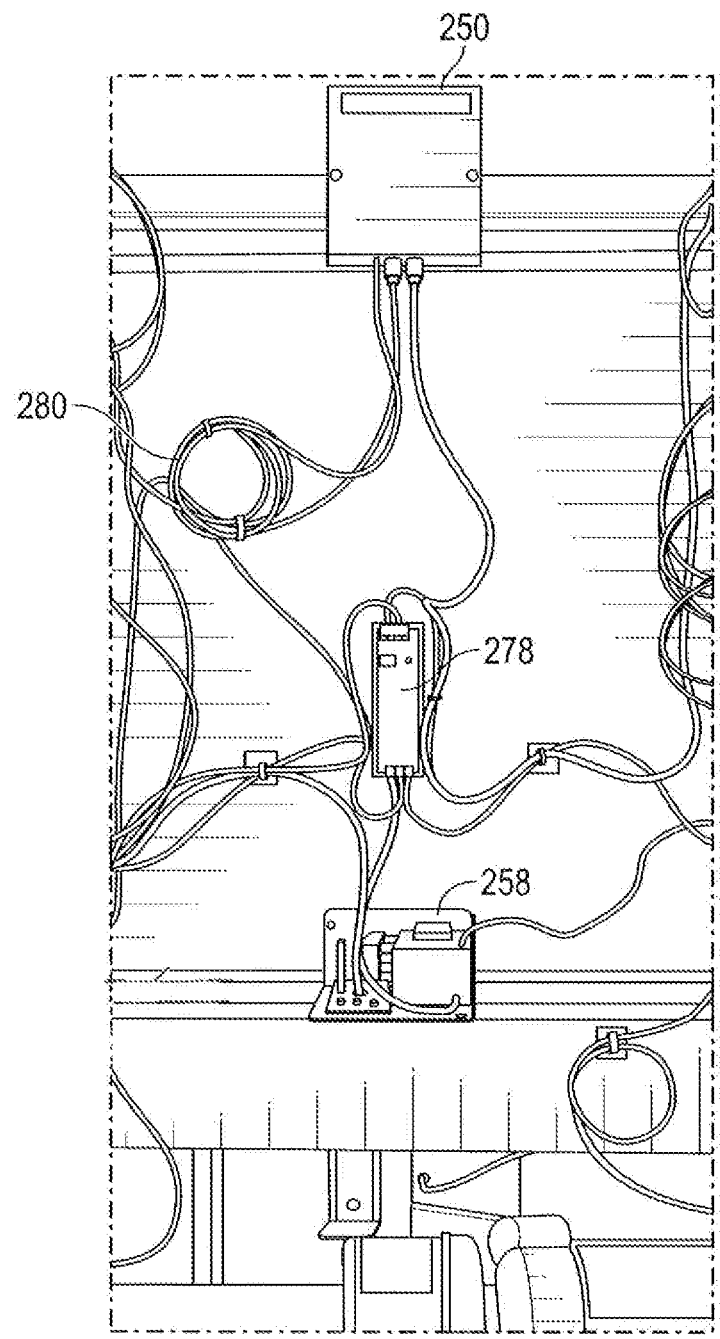
FIG. 16 depicts components required for utilization of the remotely located digitally operated control system.

FIGS. 14-16 show RYOs 270 mounted in the interior 210 of the electrical training simulator 200. As shown in FIG. 14, five RYOs 270 are mounted on the inside walls of work panels 202, 204. The RYOs 270 are mounted on standoffs (not shown). The standoffs allow wires to be connected and disconnected from each of the terminal blocks of the RYOs without damage to the RYO board. FIG. 15 shows a plurality of RYOs 270 set within the interior 210 of an embodiment of the electrical training simulator 200. FIG. 17 also shows an optional positioning of LCS 250 in the interior 210 of the electrical training simulator. Also shown is a 5 vdc power supply 258 for LCS 250 and a 12 vdc power supply 278 for the RYOs 270. Fiber optic cables 280 provide the connections between the LCS 250 and the RYOs 270.

Having thus described the preferred embodiment of the invention, what is claimed as new and desired to be protected by Letters Patent includes the following:

The invention claimed is:

1. An electrical training simulator for building and trouble-shooting electrical control circuits comprising:
   a front panel comprising a front panel component mounting plate and a front panel terminal plate;
   a rear panel in opposite facing relation with the front panel;
   a first side panel connecting a first edge of the front panel to an adjacent edge of the rear panel;
   a second side panel connecting a second edge of the front panel to an adjacent edge of the rear panel, wherein an interior space is defined between the front panel, the rear panel, the first side panel and the second side panel;
   a first power supply which provides power to the front panel;
   a first plurality of electrical components fixedly attached to the front panel component mounting plate;
   a first plurality of connector terminals set within the front terminal plate, wherein the first plurality of connector terminals is configured to allow a student to assemble a first electrical circuit by connecting any one or more of the first plurality of electrical components together and/or to the first power supply with a first plurality of connector leads; and
   a first fault induction controller connected to a first plurality of fault relay boards contained within the interior, the first plurality of fault relay boards configured to induce a fault in the first electrical circuit, wherein the first fault controller is configured to prevent the student from having any visible indication of the fault.

2. The electrical training simulator of claim 1 wherein the first fault induction controller is disposed within a first enclosure attached to the first side panel.

3. The electrical training simulator of claim 2 wherein the fault is induced by activating any one or more of a plurality of switches contained within the first enclosure.

4. The electrical training simulator of claim 1 wherein the first fault induction controller is wirelessly connected to a remote device, wherein the remote device is configured to induce the fault in the first electrical circuit.

5. The electrical training simulator of claim 4 wherein the first fault induction controller comprises a local system controller connected to a slave controller configured to actuate any one of a plurality of relays.

6. The electrical training simulator of claim 5 wherein the first fault induction controller is connected to the slave controller by a plurality of fiber-optic cables.

7. The electrical training simulator of claim 1 wherein the plurality of electrical components comprises a transformer, an alternating current drive, a 24-volt direct current power supply and a motor.

8. A method of inducing a fault into a student-assembled circuit of the electrical training simulator of claim 4 comprising the steps of:
   preparing a fault command for the fault on the remote device; and
   transmitting the fault command to the first fault induction controller.

9. An electrical training simulator for building and trouble-shooting electrical control circuits comprising:
   a front panel comprising a front panel component mounting plate and a front panel terminal plate;
   a rear panel in opposite facing relation with the front panel, the rear panel comprising a rear panel component mounting plate and a rear panel terminal plate;
   a first side panel connecting a first edge of the front panel to an adjacent edge of the rear panel;
   a second side panel connecting a second edge of the front panel to an adjacent edge of the rear panel, wherein an interior space is defined between the front panel, the rear panel, the first side panel and the second side panel;
   a first power supply which provides power to the front panel;
   a second power supply which provides power to the rear panel;
   a first plurality of electrical components fixedly attached to the front panel component mounting plate;
   a second plurality of electrical components fixedly attached to the rear panel component mounting plate;
   a first plurality of connector terminals set within the front panel terminal plate, wherein the first plurality of connector terminals are configured to allow an assembly of a first electrical circuit by connecting any one or more of the first plurality of electrical components together and/or to the first power supply with a first plurality of connector leads;
   a second plurality of connector terminals set within the rear panel terminal plate, wherein the second plurality of connector terminals are configured to allow an assembly of a second electrical circuit by connecting any one or more of the second plurality of electrical components together and/or to the second power supply with a second plurality of connector leads;
   a first fault induction controller connected to a first plurality of fault relay boards contained within the interior, the first plurality of fault relay boards configured to induce a first fault in the first electrical circuit; and
   a second fault induction controller connected to a second plurality of fault relay boards contained within the interior, the second plurality of fault relay boards configured to induce a second fault in the second electrical circuit.

10. The electrical training simulator of claim 9 wherein the first fault induction controller is disposed within a first enclosure attached to the first side panel and the second fault induction controller is disposed within a second enclosure attached to the second side panel.

11. The electrical training simulator of claim 10 wherein the first enclosure comprises a first plurality of switches and the second enclosure comprises a second plurality of switches, wherein each of the first plurality of switches is configured to induce the first fault in the first electrical circuit and each of the second plurality of switches is configured to induce the second fault in the second electrical circuit.

12. The electrical training simulator of claim 9 wherein the first fault induction controller and the second fault induction controller are wirelessly connected to a remote device, wherein the remote device is configured to induce the first fault in the first electrical circuit and the second fault in the second electrical circuit.

13. The electrical training simulator of claim 12 wherein the first fault induction controller comprises a local system controller connected to a slave controller configured to actuate any one of a plurality of relays.

14. The electrical training simulator of claim 13 wherein the local system controller is connected to the slave controller with a plurality of fiber-optic cables.

15. The electrical training simulator of claim 9 wherein the plurality of electrical components comprises a transformer, an alternating current drive, a 24-volt direct current power supply and a motor.

16. An electrical training simulator for building and trouble-shooting electrical control circuits comprising:
- a panel comprising a component mounting plate and a terminal plate;
- a power supply which provides power to the panel;
- a plurality of electrical components fixedly attached to the panel;
- a plurality of connector terminals set within the terminal plate, wherein the plurality of connector terminals is configured to allow a student to assemble an electrical circuit by connecting any one or more of the plurality of electrical components together and/or to the power supply with a plurality of connector leads; and
- a fault induction controller connected to a plurality of fault relay boards connected to the panel, wherein the fault induction controller is wirelessly connected to a remote device and the remote device is configured to induce the fault in the electrical circuit.

17. The electrical training simulator of claim 16 wherein the fault induction controller comprises a local system controller connected to a slave controller configured to actuate any one of a plurality of relays.

18. The electrical training simulator of claim 17 wherein the local system controller is connected to the slave controller by a plurality of fiber-optic cables.

19. The electrical training simulator of claim 16 wherein the plurality of electrical components comprises a transformer, an alternating current drive, a 24-volt direct current power supply and a motor.

20. A method of inducing a fault into a student-assembled circuit of the electrical training simulator of claim 16 comprising the steps of:
- preparing a fault command for the fault on the remote device; and
- transmitting the fault command to the fault induction controller.

* * * * *